United States Patent
Ahmadian et al.

(10) Patent No.: US 10,866,874 B1
(45) Date of Patent: Dec. 15, 2020

(54) APPARATUS AND METHOD FOR SAMPLING LARGE DATA SETS IN A DISTRIBUTED DATA STORAGE SYSTEM

(71) Applicant: Cloudera, Inc., Palo Alto, CA (US)

(72) Inventors: Shaun Ahmadian, San Jose, CA (US); Sushil Thomas, San Francisco, CA (US)

(73) Assignee: Cloudera, Inc., Palo Alto, CA (US)

( * ) Notice: Subject to any disclaimer, the term of this patent is extended or adjusted under 35 U.S.C. 154(b) by 0 days.

(21) Appl. No.: 16/455,026

(22) Filed: Jun. 27, 2019

Related U.S. Application Data

(60) Provisional application No. 62/690,811, filed on Jun. 27, 2018.

(51) Int. Cl.
 *G06F 11/30* (2006.01)
 *G06F 3/06* (2006.01)

(52) U.S. Cl.
 CPC ........ *G06F 11/3079* (2013.01); *G06F 3/0604* (2013.01); *G06F 3/067* (2013.01); *G06F 3/0646* (2013.01)

(58) Field of Classification Search
 CPC .. G06F 11/3079; G06F 3/0604; G06F 3/0646; G06F 3/067
 USPC ........................................................ 709/224
 See application file for complete search history.

(56) References Cited

PUBLICATIONS

Priyank Patel, Arcadia Enterprise 3.3—Moving Modern BI Beyond the Basics, retrieved from https://www.arcadiadata.com/blog/moving-modern-bi-beyond-basics/, Dec. 14, 2016, Arcadia data (Year: 2016).*

* cited by examiner

*Primary Examiner* — Nicholas R Taylor
*Assistant Examiner* — Chong G Kim
(74) *Attorney, Agent, or Firm* — Staniford Tomita LLP

(57) ABSTRACT

A system includes a distributed data storage system disseminated across worker machines connected by a network. A distributed data storage management module has instructions executed by a processor to utilize data block identifiers to track data block accesses to the distributed data storage system. A sampling module with instructions executed by the processor receives a new sample request from a client machine connected to the network. Initial data block samples are gathered from the distributed data storage system during a first time period. A revised sample request is received from the client machine during the first time period. The initial data block samples are gathered. New data block samples are collected from the distributed data storage system. The initial data block samples and the new data block samples are combined to form cumulative data block sample results. The cumulative data block sample results are supplied to the client machine.

20 Claims, 3 Drawing Sheets

APPARATUS AND METHOD FOR SAMPLING LARGE DATA SETS IN A DISTRIBUTED DATA STORAGE SYSTEM

CROSS-REFERENCE TO RELATED APPLICATION

This application claims priority to U.S. Provisional Patent Application Ser. No. 62/690,811, filed Jun. 27, 2018.

FIELD OF THE INVENTION

This invention relates generally to data management in computer networks. More particularly, this invention relates to techniques for sampling large data sets in a distributed data storage system.

BACKGROUND OF THE INVENTION

A distributed data storage system has devices that are not all attached to a common processor, such as a central processing unit. Instead, multiple computers are used to implement a distributed data storage system, which may be a distributed database or a distributed file system. The multiple computers hosting the distributed data storage system may be located in the same physical location, or they may be dispersed over a network of disaggregated interconnected computers. There is typically a master node or machine and a set of slave or worker nodes or machines that store data blocks of the distributed data storage system.

It is common for data to be continuously loaded into a distributed data storage system. Given the ever-changing nature of the loaded data, it is desirable to understand general data change trends. This is accomplished by data sampling. Typically, a user specifies an amount of data sampling, such as 10% of the data within the distributed data storage system. If the user alters the sample size, say to 20% of the data within the distributed data storage system, it is treated as a new task that requires a new set of sampled results. That is, the system is not able to leverage the already sampled results.

Accordingly, there is a need for improved techniques for sampling large data sets in distributed data storage systems.

SUMMARY OF THE INVENTION

A system includes a distributed data storage system disseminated across worker machines connected by a network. A distributed data storage management module has instructions executed by a processor to utilize data block identifiers to track data block accesses to the distributed data storage system. A sampling module with instructions executed by the processor receives a new sample request from a client machine connected to the network. Initial data block samples are gathered from the distributed data storage system during a first time period. A revised sample request is received from the client machine during the first time period. The initial data block samples are gathered. New data block samples are collected from the distributed data storage system. The initial data block samples and the new data block samples are combined to form cumulative data block sample results. The cumulative data block sample results are supplied to the client machine.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
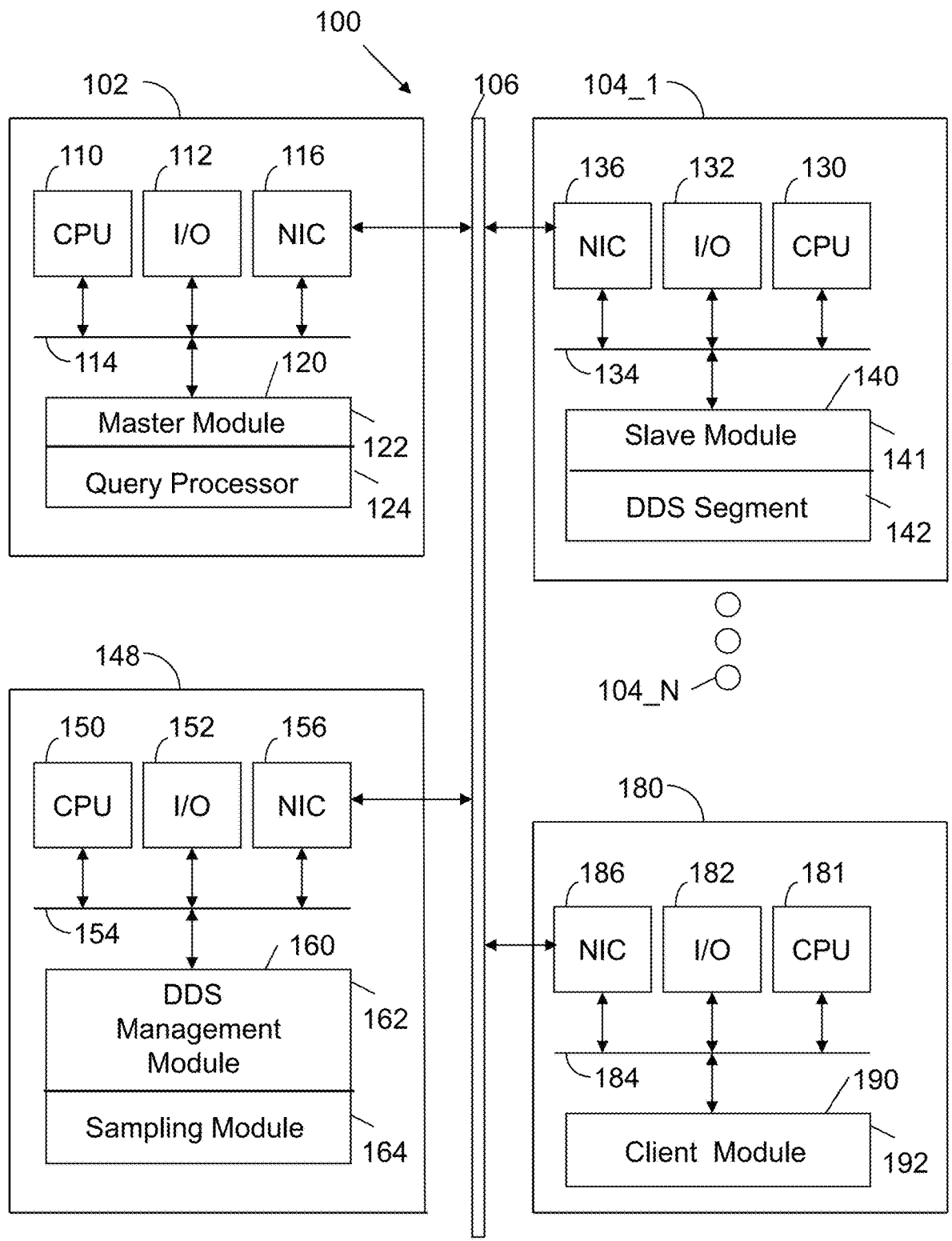
FIG. 1 illustrates a system configured in accordance with an embodiment of the invention.

FIG. 1 illustrates a system 100 configured in accordance with an embodiment of the invention. The system 100 includes a master machine 102 in communication with a set of slave or worker machines 104_1 through 104_N via a network 106, which may be any combination of wired and wireless networks. The master machine 102 includes a central processing unit 110 in communication with a set of input/output devices 112 via a bus 114. The input/output devices 112 may include a keyboard, mouse, touch display and the like. A network interface circuit 116 is also connected to the bus 114 to provide connectivity to network 106. A memory 120 is also connected to the bus 114. The memory 120 includes instructions executed by the central processing unit 110. In particular, the memory 120 stores a master module 122, which includes executable instructions to perform master node operations associated with a distributed data storage system. The memory 120 also stores a query processor 124, which processes queries by applying them across the distributed data storage system implemented across the worker nodes 104_1 through 104_N.

Worker machine 104_1 includes a central processing unit 130, input/output devices 132, a bus 134, a network interface circuit 136 and a memory 140. The memory 140 stores a slave module 141 to implement slave processing at the direction of the master machine 102. The memory 140 also stores a distributed data storage (DDS) segment 142. The DDS segment 142 may be a partition of a distributed database or a segment thereof. The DDS segment 142 may also be a file of a distributed file system or a segment of such a file. Additional worker machines up to 104_N are similarly configured.

A sampling machine 148 (or multiple instances of the sampling machine) is also be connected to network 106. The sampling machine 148 includes a central processing unit 150, input/output devices 152, a bus 154, a network interface circuit 156 and a memory 160. The memory 160 stores a distributed data storage (DDS) management module 162. The DDS management module 162 includes instructions executed by processor 150 to assign data block identifiers to different data blocks of the DDS system.

The memory 160 also stores a sampling module 164. The sampling module 164 includes instructions executed by processor 150 to implement operations disclosed herein. In particular, the sampling module 164 implements sampling operations by using data block identifiers to track data block access to the distributed data storage system. If a current sampling request requires incrementally more samples (e.g., an initial request for sampling of 10% of the data is changed to a request for sampling of 20% of the data), the sampling module 164 gathers the initial data block samples. It then collects new data block samples from the distributed data storage system. The initial data block samples and the new data block samples are combined to form cumulative data block sample results.

Thus, a user can turn on a sampling mode to more easily perform ad hoc exploration on very large data sets without the usual delays of waiting for the entire table (or all file blocks) to be read. Those skilled in the art will note that this approach works well with cloud architectures. The underlying store is a set of objects, and the name space can be partitioned along with individual files. Visualizing data whether it is from local file systems like Hadoop Distributed File System (HDFS) or on large cloud data stores, such as Amazon S3® can be incrementally queried using this method.

FIG. 1 also illustrates a client machine 180 connected to network 106. The client machine 180 includes a central processing unit 181, input/output devices 182, a bus 184, a network interface circuit 186 and a memory 190. The memory 190 stores a client module 192, which allows the client machine to pass queries to the query processor 124 of the master machine 102, which executes the query across the distributed data storage system implemented across worker machines 104_1 through 104_N. The client machine 180 may also solicit a sampling request to the sampling module 164.

Figure 2:
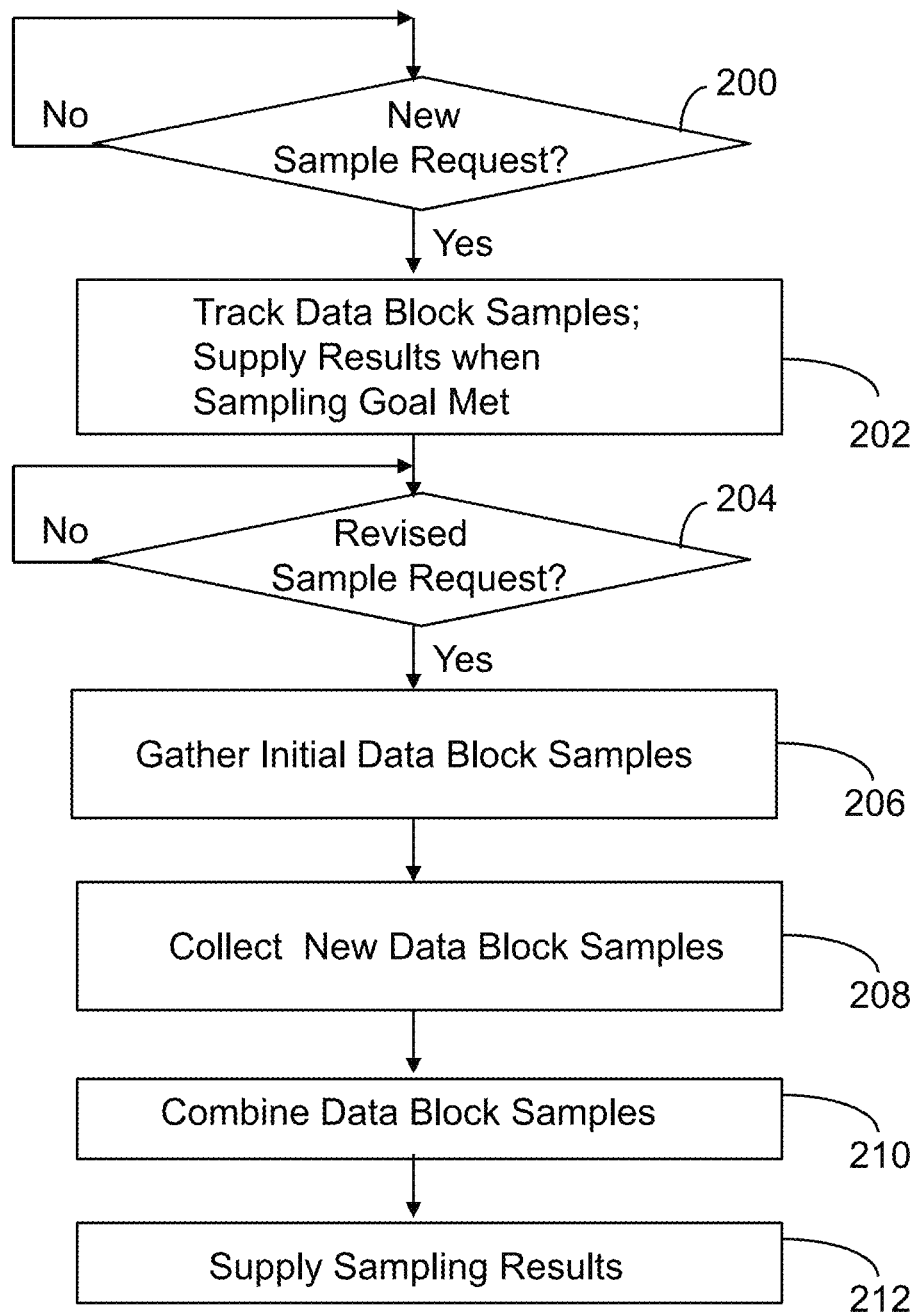
FIG. 2 illustrates processing operations associated with an embodiment of the invention.

FIG. 2 illustrates processing operations associated with an embodiment of the sampling module 164. The sampling module 164 waits for a new sample request 200. In the event of such a request (200—Yes), data block samples are tracked and results are supplied when the sampling goal is met 202.

In one embodiment, the sampling module 164 communicates with the distributed data storage management module 162 to track initial data block samples collected from the distributed data storage system during a first time period. As previously indicated, the distributed data storage management module includes instructions executed by processor 150 to utilize data block identifiers to track data block accesses. In one embodiment, the form of the data block identifiers is configurable (e.g., a configurable hash) and the data block size is configurable.

During the first time period that initial sampling results are collected, it is periodically determined whether there is a revised sample request 204. If so (204—Yes), the initial data block samples are gathered 206. That is, the initial data block samples collected prior to the revised sample request are gathered as an initial sample set that is augmented through the collection of new data block samples 208. The collection of new data block samples is informed by the fact that certain data blocks have already been sampled and therefore should not be sampled again. In other words, the data block identifiers associated with the initial data block samples are used to select new data block identifiers.

When the data sampling goal is met, the initial data block samples and the new data block samples are combined to form cumulative sample results 210. The sampling results may then be supplied 212. For example, the sampling module 164 provides the sampling results to the client machine 180 via network 106.

Figure 3:
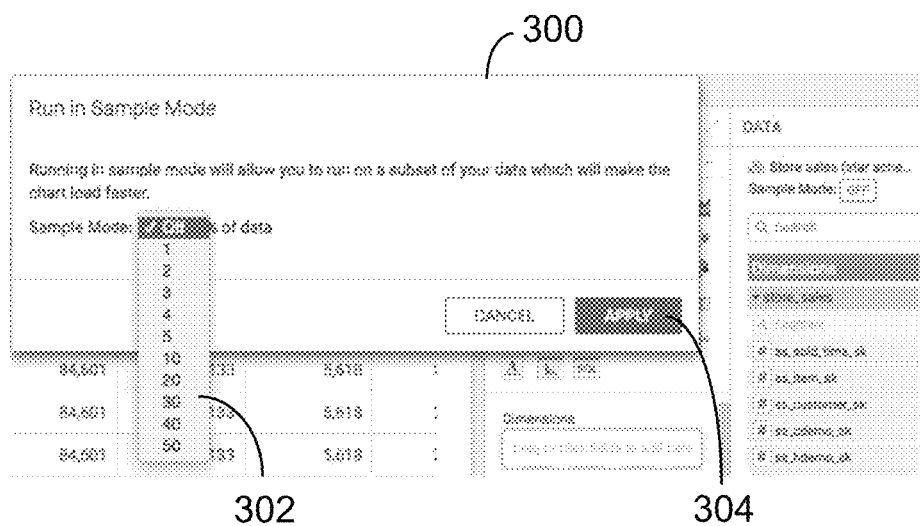
FIG. 3 illustrates a user interface utilized in accordance with an embodiment of the invention.

FIG. 3 illustrates a user interface 300 that may be used in accordance with an embodiment of the invention. A pull-down menu 302 may include a list of different sample sizes (e.g., percentage of total data size to be sampled). A value may be selected and then the apply button 304 may be activated to initiate the sampling process. In one embodiment, a progress bar is displayed to the user to characterize the progress of the sampling task. In one embodiment, the sample results are supplied when the sampling task is completed. In another embodiment, sampling results are supplied at a specified interval (e.g., for each 1% of sampled data).

Those skilled in the art will recognize a number of advantages associated with the disclosed technology. First, a user obtains sampling results faster since a revised sampling request leverages sampling results from an initial sampling request. That is, the system 100 provides sampling results in a computationally efficient manner. Gathering initial data block samples is computationally far more efficient than reinitiating a sampling task. Thus, the invention provides a technical advantage in terms of computational efficiency. The disclosed technique also reduces memory accesses, thereby improving memory utilization across the system 100.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A system, comprising;
   a distributed database storage (DDS) system disseminated across worker machines connected by a network;
   a distributed data storage management module with instructions executed by a processor to assign data block identifiers to different data blocks of the DDS system, and utilize the data block identifiers to track data block accesses to the distributed data storage system; and
   a sampling module with instructions executed by the processor to:
      receive a new sample request from a client machine connected to the network, gather initial data block samples from the distributed data storage system during a first time period,
receive a revised sample request from the client machine during the first time period,
collect new data block samples from the distributed data storage system, wherein the data block identifiers are used to select the new data block samples,
combine the initial data block samples and the new data block samples to form cumulative data block sample results, and
supply the cumulative data block sample results to the client machine.

2. The system of claim 1 wherein the new data block samples augment the initial block samples.

3. The system of claim 2 wherein data block identifiers associated with the initial data block samples are used to select new data block identifiers for the new data block samples to prevent sampling again of data samples from the initial data block samples for the new data block samples.

4. The system of claim 3 wherein the data block identifiers comprise configurable hash values.

5. The system of claim 4 wherein a data block size for each of the different data blocks is configurable.

6. The system of claim 1 wherein the revised sample request comprises a request for incrementally more samples than in the new sample request.

7. The system of claim 6 wherein the new sample request comprises a request to sample a first percentage of the data block accesses, and the revised sample request comprises a request to sample a second percentage of the data block accesses that is higher than the first percentage.

8. The system of claim 1 wherein the cumulative data block sample results are used to provide visualization of the data block accesses through a user interface on the client machine, and that can be displayed for different sample requests including the new sample request and the revised sample request.

9. The system of claim 1 wherein the DDS system is deployed in a cloud network.

10. The system of claim 9 wherein the DDS system comprises one of a local file system, a Hadoop Distributed File System, or a large cloud data store.

11. A method comprising:
assigning data block identifiers to different data blocks of a distributed database storage (DDS) system to track data block accesses to the distributed data storage system;
receiving a new sample request from a client machine connected to the network;
gathering initial data block samples from the distributed data storage system during a first time period;
receiving a revised sample request from the client machine during the first time period;
collecting new data block samples from the distributed data storage system, wherein the data block identifiers are used to select the new data block samples;
combining the initial data block samples and the new data block samples to form cumulative data block sample results, and
supplying the cumulative data block sample results to the client machine.

12. The method of claim 11 wherein the new data block samples augment the initial block samples.

13. The method of claim 12 wherein data block identifiers associated with the initial data block samples are used to select new data block identifiers for the new data block samples to prevent sampling again of data samples from the initial data block samples for the new data block samples.

14. The method of claim 13 wherein the data block identifiers comprise configurable hash values, and further wherein a data block size for each of the different data blocks is configurable.

15. The method of claim 11 wherein the revised sample request comprises a request for incrementally more samples than in the new sample request.

16. The method of claim 11 further comprising:
providing, using the cumulative data block sample results, a visualization of the data block accesses through a user interface on the client machine; and
displaying the visualization for different sample requests including the new sample request and the revised sample request.

17. The method of claim 11 wherein the DDS system is disseminated across worker machines connected by a network, and is deployed in a cloud network, and further wherein the DDS system comprises one of a local file system, a Hadoop Distributed File System, or a large cloud data store.

18. A method comprising:
assigning data block identifiers to different data blocks of a distributed database storage (DDS) system to track data block accesses to the distributed data storage system;
receiving a first sample request from a client machine connected to the network;
gathering, in response to the first sample request, initial data block samples from the DDS system during a first time period;
receiving a new sample request from the client machine during the first time period;
collecting, in response to the new sample request, new data block samples from the DDS system, wherein the new data block samples augment the initial data block samples, and further wherein the data block identifiers are used to select the new data block samples to prevent sampling again of any initial data block samples for the new data block samples;
combining the initial data block samples and the new data block samples to form cumulative data block sample results, and
supplying the cumulative data block sample results to the client machine.

19. The method of claim 18 wherein the supplying step supplies the cumulative data block sample results for display of a visualization of the data block accesses for the first sample request and the new sample request.

20. The method of claim 19 wherein the DDS system is disseminated across worker machines connected by a network, and is deployed in a cloud network, and further wherein the DDS system comprises one of a local file system, a Hadoop Distributed File System, or a large cloud data store.

* * * * *